Sept. 12, 1933.　　　K. MILLER　　　1,926,783
AUTOMATIC CLUTCH LOCK-OUT DEVICE
Filed Feb. 25, 1932
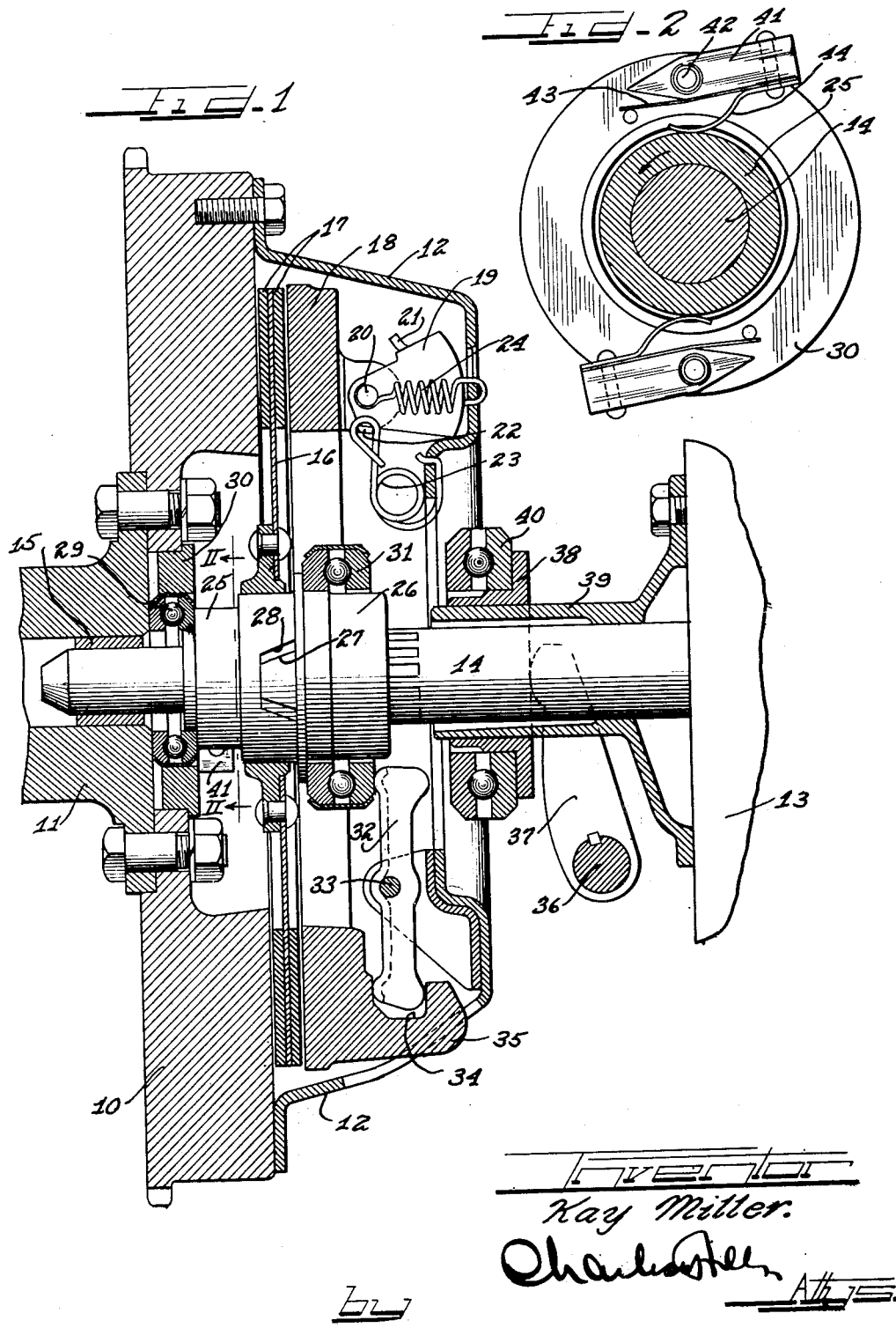
Inventor
Kay Miller.
by Charles Allen
Attys.

Patented Sept. 12, 1933

1,926,783

UNITED STATES PATENT OFFICE 1,926,783

AUTOMATIC CLUTCH LOCK-OUT DEVICE

Kay Miller, Rockford, Ill., assignor to Borg-Warner Corporation, Chicago, Ill., a corporation of Illinois Application February 25, 1932. Serial No. 595,126

13 Claims. (Cl. 192—103)

This invention relates to automatically operated clutches wherein the clutch engages and disengages at predetermined rotative speeds. More particularly, my invention relates to an automatic lock-out for such clutches which will act to reengage the clutch should the driving member, such as the engine of an automotive vehicle, stop for any reason while the clutch is disengaged but the driven member is rotating due to vehicle momentum or coasting.

A great draw back of the automatically operated clutches which engage at a predetermined speed is that they also disengage or free-wheel when the driving elements drop below the engaging speed. In automotive applications, this feature is normally advantageous since it allows coasting or free wheeling when the accelerator pedal is released to allow the engine to drop to idling speeds. However, it has been found that with such automatic free wheeling the engine may stop while so free wheeling, and it is an object of this invention to provide means for automatically reengaging the clutch when the engine thus stops inadvertently in order to automatically restart the engine. A further advantage of my invention is that the engine can be started by pushing the vehicle along while in gear, as such a procedure is often resorted to when the engine fails to start in the usual manner.

My invention has been illustrated as applied to a novel form of automatic clutch as fully described in the co-pending application, Serial No. 594,025 filed February 19, 1932 of Kenneth E. Lyman.

Other and further important objects of this invention will be apparent from the disclosures in the specification and the accompanying drawing.

This invention (in a preferred form) is illustrated in the drawing and hereinafter more fully described.

On the drawing:

Figure 1 is a vertical longitudinal section through an automatic clutch embodying the features of this invention.

Figure 2 is a fragmentary detail cross section on the line II—II of Figure 1 showing one form my invention may take.

As shown:

I have chosen to illustrate my invention as applied to the automatic clutch more fully described in the previously mentioned copending application of Kenneth E. Lyman and for the present purposes it may be stated that this clutch embodies a self-energizing engagement or pressure build-up proportional to the slippage between the clutch elements after initial engagement, the initial engagement resulting from centrifugal force acting on weights so pivoted as to advance the clutch pressure plate into engagement with the driven member. Such a clutch structure has many advantages for normal operation. Occasionally, however, the usual engine starting mechanism is inadequate and also the engine may stall or stop while the clutch is disengaged due to the vehicle momentum causing the clutch to disengage and thus provide free wheeling. In either case, it then becomes desirable to be able to engage the clutch to start the engine by movement of the vehicle.

The illustrated clutch is associated with the flywheel 10 of an internal combustion engine, the rear end of the crankshaft 11 of the engine being shown. A clutch housing 12 is bolted to the rear face of the flywheel 10. A transmission case is indicated by the reference numeral 13, the drive shaft 14 of which extends forwardly through the clutch housing and has its front end piloted in a bearing 15 concentrically mounted in the hollow end of the crankshaft 11. Since the transmission drive shaft 14 forms the driven shaft relative to the clutch, it will for convenience be so referred to hereinafter.

A clutch or driven disc 16 carries the usual friction facings 17 and is engaged between the rear face of the flywheel and a pressure plate 18 within the clutch housing, the clutch disc serving to drive the driven shaft 14 when clamped between the pressure plate and the flywheel. In a conventional clutch the pressure plate would normally be advanced to the left by spring pressure so that the clutch would be engaged at all times unless manually retracted. In the illustrated clutch the pressure plate is normally retracted, and is only advanced into engagement when the engine reaches a predetermined rotative speed sufficient to energize the centrifugally operated mechanism to be hereinafter described. Thus the clutch differs from the conventional manually operated clutch in that it engages only at a predetermined speed of the driving member and can disengage for free wheeling when the engine is slowed down to idling by release of the accelerator.

As shown in Figure 1 a plurality of weights 19 are distributed about the pressure plate 18 and are pivoted thereto at 20, the weights being so arranged and proportioned as to swing outwardly under the influence of centrifugal force at a predetermined rotative speed, the outward swing being limited by stops 21 mounted on weights 19 which then contact the pressure plate. The weights 19 carry offset lugs 22 which engage one end of torsion springs 23 the other ends of which are anchored to the housing. Retractor springs 24 are also engaged between the pivots 20 and the housing, the springs 23 and 24 being so proportioned that the retractor springs overbalance the torsion springs in the absence of centrifugal forces strong enough to swing the weights 19 outwardly, thus retracting the pressure plate and disengaging the clutch. When the weights 19 swing outwardly, however, the eccentric movement of the lugs 22 increases the load on the torsion springs 23 sufficiently to overcome the restraining effect of the retractor springs 24, thus causing the pressure plate 18 to move to the left to take up the running clearances and cause an initial engagement of the pressure plate 18 with the clutch facings 17. The engagement develops sufficient friction to drag on the disc 16 but is only intended to cause a partial engagement of the clutch.

The illustrated clutch further differs from the conventional clutch in that the clutch disc 16 is mounted on a sleeve 25 free to rotate on the driven shaft 14, the drive being taken from the sleeve 25 to a collar 26 splined to the shaft, which collar is free to slide along the shaft, and carries tongues 27 engaging in slots 28 in the sleeve 25 the sides of the tongue and slot being inclined so that torque or drag on the disc 16 and its sleeve 25 causes the tongue to climb up the walls of the slot, pushing the collar 26 to the right in the figure. The tongue and groove construction thus has a cam effect when friction or slippage occurs between the clutch facings and the pressure plate. The disc sleeve 25 is backed by a thrust bearing 29 in a ring 30 located in the hub of the flywheel to take the end thrust or reaction on the sleeve 25 due to the cam surfaces of the tongues and grooves.

The collar 26 carries a thrust bearing 31 which bears against one end of a plurality of pressure fingers 32 pivoted to the housing at 33 and bearing at their outer ends in a notch 34 formed in bosses 35 on the pressure plate. Thus the initial movement of the collar to the right which results from the previously described action of the centrifugal weights serves to apply further pressure on the pressure plate 18 through the pressure fingers 32, the further pressure acting as a further drag on the clutch disc which acts through the sleeve 25 to further build up the pressure on the pressure plate as long as slippage occurs in the clutch elements. The clutch is thus self-energizing in that it builds up its pressure as long as slippage occurs thus providing a smoother and ultimately positive engagement the pressure to secure which is proportional to the load transmitted. Further, if a sudden accretion of load is imposed the clutch will slip somewhat while further clutch pressure is being built up to carry the increased load. It will be evident that the clutch will carry full torque at its normal engaging speed due to the self-engaging feature and the clutch is thereby distinguished from centrifugal clutches as heretofore proposed.

The pressure fingers 32 lend themselves admirably for use in connection with a manual throwout, such as the usual clutch pedal, acting on a shaft 36 carrying forks 37. These forks shift a sliding collar 38 to the left on a sleeve 39 bolted to the transmission case, the collar carrying a thrust bearing 40 to engage the pressure finger 32 in a direction opposite to the action of the collar 26 thus positively lifting the pressure plate 18 away from the clutch disc regardless of the load or the action of the centrifugal weights.

The clutch engagement depends upon the driving member maintaining a speed in excess of that required to throw out the centrifugal weights 19. If the driven shaft develops a tendency to over-run the engine due to coasting or a release of the engine accelerator, then the reversal of torque on the clutch disc 16 tends to release the clutch for free wheeling. While free wheeling, the engine may stop of its own accord and it would then be desirable to restart the engine by using the momentum of the vehicle. Also if it is found difficult to start the engine for any reason, it would be convenient to be able to crank the engine by engaging the clutch and transmission and pushing the car. These desirable features are accomplished by my invention which provides means for automatically engaging the clutch when the engine speed drops below the desired idling speed while the driven shaft is over-running the engine. Thus my invention is intended to come into action only when the driven shaft is over-running the engine and the latter falters or fails to turn up to its normal idling speed.

I accomplish this result by mounting a pair of weights 41 so pivoted at 42 to the thrust bearing centering ring 30 as to swing outwardly at the desired engine idling speed. A spring 43 serves to return the weights to their neutral position below the idling speed, as shown in Figure 2, and the weights carry a second and heavier spring 44 intended to drag on the clutch disc sleeve 25 under such conditions. This drag acts to further pull the weights in a clockwise direction about their pivots to increase the pressure and also imposes sufficient drag on the clutch disc to initiate the previously described self-energizing action to cause a full engagement of the clutch with the driven shaft 14 then acting as the driving member. This results in the clutch automatically picking up the load of a dead engine whenever the vehicle is moving with the transmission gears engaged.

The normal operation of the clutch has been described hereinbefore and need not be brought out in detail. It suffices to say that the centrifugal weights 19 and the springs therefor are so proportioned as to come into action at a predetermined engine rotative speed somewhat above idling speed so that the clutch is automatically disengaged when the engine is idling regardless of whether the vehicle is in motion. If the vehicle is coasting and the engine drops much below the desired idling speed or stops entirely as frequently happens with free wheeling installations, the device of this invention comes into action to automatically lock out the free wheeling feature by reengaging the clutch to turn the engine over at a speed corresponding to the transmission gearing and vehicle speed. When the engine has stopped, the weights 41 swing into the position shown in Figure 2 due to the action of the springs 43, and remain in this position until the engine reaches a rotative speed appreciably below idling speed, whereupon they swing out under the influence of centrifugal force to disengage the springs 44 from the clutch disc sleeve 25.

It will thus be seen that I have invented a new and improved automatic clutch mechanism which is automatically engaged when the engine speed drops below normal idling, without interfering with the normal automatic operation and free wheeling of the clutch at other times when the engine is operating properly.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a clutch, a driving member, a driven member, frictional connecting means between said members, means for exerting a force on said connecting means proportional to the torque of the driving member, means actuated at a predetermined rotative speed of the driving member for energizing said force exerting means, and means actuated by an over-running rotative movement of the driven member when the driving member rotates below a predetermined speed, for also energizing said force exerting means to cause the driven member to drive the driving member.

2. In a clutch, a driving member, a driven member, frictional connecting means between said members, means for exerting a force on said connecting means proportional to the torque of the driving member, means actuated at a predetermined rotative speed of the driving member for energizing said force exerting means, and means actuated by an over-running rotative movement of the driven member when the driving member rotates below a predetermined speed, for also energizing said force exerting means to cause the driven member to drive the driving member, and manually operable means for disengaging said connecting means regardless of either energizing means.

3. In a clutch, a driving member, a driven member, frictional connecting means between said members, means for exerting an increasing force on said connecting means proportional to the slippage occurring during engagement of the connecting means, means actuated by initial rotative movement of the driving member for producing an initial engagement of the connecting means, and means carried by the driving member and rendered inactive above a predetermined rotative speed thereof for also producing an initial engagement of the connecting means when the driven member over-runs the driving member.

4. In a clutch, a driving member, a driven member, frictional connecting means between said members, means for exerting an increasing force on said connecting means proportional to the slippage occurring during engagement of the connecting means, means actuated by initial rotative movement of the driving member for producing an initial engagement of the connecting means, and means carried by the driving member and rendered inactive above a predetermined rotative speed thereof for also producing an initial engagement of the connecting means when the driven member over-runs the driving member, and manually operable means for disengaging said connecting means regardless of either energizing means.

5. A clutch mechanism comprising a driving member, a driven member, clutch elements carried by each member, the driven clutch element having a limited rotative movement relative to the driven member, centrifugally operated means for bringing the clutch elements into initial engagement to cause movement of the driven clutch element, means operated by the limited rotative movement of the driven clutch member relative to the driven member to build up pressure on the clutch elements in proportion to said relative movement, and means carried by the driving member and energized below a predetermined rotative speed thereof, when the driven member over-runs the driving member, to also cause a relative rotary movement between the driven clutch element and the driven member whereby the driven member will then pick-up and drive the normally driving member.

6. A clutch mechanism comprising a driving member, a driven member, clutch elements carried by each member, the driven clutch element having a limited rotative movement relative to the driven member, centrifugally operated means for bringing the clutch elements into initial engagement to cause movement of the driven clutch element, means operated by the limited rotative movement of the driven clutch member relative to the driven member to build up pressure on the clutch elements in proportion to said relative movement, and centrifugally responsive means carried by the driving member and adapted to be rendered inoperative above a predetermined rotative speed of the driving member for also causing clutch engagement when the driven member over-runs the driving member.

7. A clutch mechanism comprising a driving member, a driven member, clutch elements carried by each member, the driven clutch element having a limited rotative movement relative to the driven member, centrifugally operated means for bringing the clutch elements into initial engagement to cause movement of the driven clutch element, means operated by the limited rotative movement of the driven clutch member relative to the driven member to build up pressure on the clutch elements in proportion to said relative movement, and means carried by the driving member and energized below a predetermined rotative speed thereof, when the driven member over-runs the driving member, to also cause a relative rotary movement between the driven clutch element and the driven member whereby the driven member will then pick-up and drive the normally driving member, and manually operable means for disengaging the clutch elements at will.

8. A clutch mechanism comprising a driving member, a driven member, clutch elements carried by each member, the driven clutch element having a limited rotative movement relative to the driven member, centrifugally operated means for bringing the clutch elements into initial engagement to cause movement of the driven clutch element, means operated by the limited rotative movement of the driven clutch member relative to the driven member to build up pressure on the clutch elements in proportion to said relative movement, and centrifugally responsive means carried by the driving member and adapted to be rendered inoperative above a predetermined rotative speed of the driving member for also causing clutch engagement when the driven member over-runs the driving member, and manually operable means for disengaging the clutch elements at will.

9. A clutch mechanism comprising a driving member, a driven member, clutch elements carried by each member, the driven clutch element having a limited rotative movement relative to the driven member, means operated by the limited rotative movement of the driven clutch member relative to the driven member to build up pressure on the clutch elements in proportion to said relative movement, and means carried by the driving member and energized below a predetermined rotative speed thereof, when the driven member over-runs the driving member, to cause a relative rotary movement between the driven clutch element and the driven member whereby the driven member will then pick-up and drive the normally driving member.

10. A clutch mechanism comprising a driving member, a driven member, clutch elements carried by each member, the driven clutch element having a limited rotative movement relative to the driven member, means operated by the limited rotative movement of the driven clutch member relative to the driven member to build up pressure on the clutch elements in proportion to said relative movement, and centrifugally responsive means carried by the driving member and adapted to be rendered inoperative above a predetermined rotative speed of the driving member for causing clutch engagement when the driven member over-runs the driving member.

11. A clutch of the class described comprising a driven member a clutch disc carried thereby, driving clutch members one of which is mounted for axial movement to frictionally engage said clutch disc, centrifugally disengageable means carried by the driving clutch members for advancing said driving clutch members into initial frictional engagement with the clutch disc upon over-running of the driven member when the driving member falls below a predetermined rotative speed, and means actuated by slippage during the initial engagement for producing further axial movement of the clutch members to increase the pressure between said driving clutch members and the clutch disc.

12. A clutch of the class described comprising a driven member, a clutch disc carried thereby, driving clutch members one of which is mounted for axial movement to frictionally engage said clutch disc, centrifugally disengageable means carried by the driving clutch members for advancing said driving clutch members into initial frictional engagement with the clutch disc upon over-running of the driven member when the driving member falls below a predetermined rotative speed, and means actuated by slippage during the initial engagement for producing further axial movement of the clutch members to increase the pressure between said driving clutch members and the clutch disc, and manually operable means for disengaging the clutch elements at will.

13. A clutch of the class described comprising driving and driven members, centrifugally responsive means for engaging said members at a predetermined speed, and centrifugally disengageable means carried by the driving member and adapted to also engage said members below the predetermined rotative speed at which the centrifugally disengageable means responds to centrifugal force.

KAY MILLER.